(12) United States Patent
Fujiki et al.

(10) Patent No.: US 11,336,861 B2
(45) Date of Patent: May 17, 2022

(54) VIDEO SIGNAL RECEPTION MODULE AND VIDEO SIGNAL TRANSMISSION AND RECEPTION SYSTEM

(71) Applicant: THINE ELECTRONICS, INC., Tokyo (JP)

(72) Inventors: Rei Fujiki, Tokyo (JP); Daisuke Iwama, Tokyo (JP)

(73) Assignee: THINE ELECTRONICS. INC., Tokyo (JP)

( * ) Notice: Subject to any disclaimer, the term of this patent is extended or adjusted under 35 U.S.C. 154(b) by 98 days.

(21) Appl. No.: 16/245,528

(22) Filed: Jan. 11, 2019

(65) Prior Publication Data

US 2019/0222796 A1 Jul. 18, 2019

(30) Foreign Application Priority Data

Jan. 12, 2018 (JP) .............................. JP2018-003291

(51) Int. Cl.
*H04N 5/77* (2006.01)
*H04N 5/38* (2006.01)
(Continued)

(52) U.S. Cl.
CPC ............ *H04N 5/77* (2013.01); *H04N 5/3765* (2013.01); *H04N 5/38* (2013.01); *H04N 5/44* (2013.01); *H04N 7/181* (2013.01); *H04N 21/426* (2013.01)

(58) Field of Classification Search
None
See application file for complete search history.

(56) References Cited

U.S. PATENT DOCUMENTS 4,037,250 A * 7/1977 McGahan ........ G08B 13/19634
348/159
4,860,101 A 8/1989 Pshtissky et al.
(Continued)

FOREIGN PATENT DOCUMENTS

CN 1228900 A 9/1999
CN 101742092 A 6/2010
(Continued)

OTHER PUBLICATIONS

"Deep learning seminar" introducing the front lines of NVIDIA, automatic driving and automatic recognition, IMPRESS, Internet URL: <https://car.watch.impress.co.jp/docs/topics/717652.html>, Aug. 26, 2015, pp. 1-20 (total 57 pages).
(Continued)

*Primary Examiner* — Bob A Phunkulh
(74) *Attorney, Agent, or Firm* — Sughrue Mion, PLLC

(57) ABSTRACT

A video signal transmission and reception system includes a first video signal receiver and a second video signal receiver in a video signal reception module and a video signal transmitter in a camera module. The video signal reception module includes the first video signal receiver, the second video signal receiver, and a central operation processor. A frame signal generated in the first video signal receiver is sent to a video signal transmitter of a first group and is output to the second video signal receiver. In addition, the frame signal generated in the first video signal receiver is input into the second video signal receiver and is sent to a video signal transmitter of a second group from the second video signal receiver.

13 Claims, 6 Drawing Sheets

(51) Int. Cl.
*H04N 7/18* (2006.01)
*H04N 5/376* (2011.01)
*H04N 5/44* (2011.01)
*H04N 21/426* (2011.01)

(56) References Cited

U.S. PATENT DOCUMENTS

| | | | | |
|---|---|---|---|---|
| 5,436,660 | A * | 7/1995 | Sakamoto | H04N 5/33 348/229.1 |
| 5,579,060 | A * | 11/1996 | Elberbaum | G11B 27/028 348/705 |
| 5,995,140 | A * | 11/1999 | Cooper | H04N 7/181 348/153 |
| 6,008,867 | A * | 12/1999 | Cooper | H04N 7/181 348/159 |
| 7,511,764 | B2 * | 3/2009 | Cooper | H04N 5/23206 348/516 |
| 9,041,813 | B1 * | 5/2015 | Yakay | H04N 5/126 348/159 |
| 10,425,570 | B2 * | 9/2019 | van Hoff | G11B 27/11 |
| 10,574,243 | B2 * | 2/2020 | Shen | H03L 7/093 |
| 2004/0187044 | A1 | 9/2004 | Barman | G06F 3/005 713/400 |
| 2006/0204229 | A1 * | 9/2006 | Onodera | H04N 7/181 386/223 |
| 2007/0217765 | A1 * | 9/2007 | Itoh | H04N 5/76 386/202 |
| 2010/0045817 | A1 * | 2/2010 | Saijo | H04N 5/268 348/222.1 |
| 2011/0032946 | A1 * | 2/2011 | Hardy | H04N 21/64322 370/401 |
| 2014/0022231 | A1 * | 1/2014 | Saitoh | G09G 3/3648 345/212 |
| 2017/0201724 | A1 * | 7/2017 | Galvin | G08B 13/19656 |
| 2017/0230613 | A1 | 8/2017 | Endo | |
| 2019/0222790 | A1 | 7/2019 | Fujiki et al. | |
| 2019/0222795 | A1 | 7/2019 | Fujiki et al. | |
| 2020/0275025 | A1 * | 8/2020 | El Kolli | H04N 5/23241 |
| 2021/0172695 | A1 * | 6/2021 | Geier | G01V 5/00 |

FOREIGN PATENT DOCUMENTS

| | | |
|---|---|---|
| CN | 103795969 A | 5/2014 |
| JP | 9-37141 A | 2/1997 |
| JP | 10-136409 A | 5/1998 |
| JP | 2000-517139 A | 12/2000 |
| JP | 2007-49218 A | 2/2007 |
| JP | 2011-13736 A | 1/2011 |
| WO | 98/09432 A1 | 3/1998 |
| WO | 2017/001069 A1 | 1/2017 |

OTHER PUBLICATIONS

"Image sensing products /Image Sensuring products", Sony Japan, Internet URL: <https://www.sony.co.jp/Products/ISP/interview/vol01.html>, Searched on Dec. 11, 2017, pp. 1-6 (total 15 pages).

"Board setting method for camera connection (external trigger)—External trigger synchronized imaging with AIPTool!—", Avaldata, Internet URL: <http://www.avaldata.co.jp/solution_imaging/cameralink_tips/aiptool_ex_trg.html>, Searched on Dec. 11, 2017, pp. 1-9 (total 21 pages).

"Ambarella Unveils HS 360$^{mt;epmuboubxmx}$ View Automotive Camera Solution, New MotorVu™ 360 reference design enables four-channel HD surround view and recording", Ambarella, Internet URL: <https://www.ambarella.com/news/48/122/Ambarella-Unveils-HD-360-View-Automotive-Camera-Solution>,Searched on Dec. 11, 2017, pp. 1-4.

"B5 Video Serializer/De-Serializer Companion Chips", Ambarella, Internet URL:https://www.ambarella.com/uploads/docs/MotorVu-360-product-brief.pdf, Searched on Dec. 25, 2017, pp. 1-2.

U.S. Appl. No. 16/245,460, filed Jan. 11, 2019 (Fujiki et al).
U.S. Appl. No. 16/245,493, filed Jan. 11, 2019 (Fujiki et al).

* cited by examiner

VIDEO SIGNAL RECEPTION MODULE AND VIDEO SIGNAL TRANSMISSION AND RECEPTION SYSTEM

TECHNICAL FIELD

The present invention relates to a video signal reception module and a video signal transmission and reception system.

BACKGROUND

A technology for analyzing a plurality of videos acquired at the same time using a plurality of cameras has been developed. For example, in an advanced driver assistance system (ADAS) that detects and avoids a possibility of occurrence of an accident or the like in advance, in order to implement automated driving, surrounding environment information such as a vehicle, a pedestrian, and an inter-vehicle distance is extracted from a camera video information by processing video information acquired by multiple cameras mounted in an automobile in real time and applying deep learning technology. A graphic processor unit (GPU) that performs a pattern matching process using deep learning technology has been developed. By using the GPU, for example, a platform that can process 12 channels of camera video signals can be configured (Non-Patent Document 1).

In such a system, it is important that multiple cameras acquire videos substantially at the same time. For example, in a case where it is assumed that a plurality of cameras mounted in an automobile legally traveling at a speed of 250 km/h on Autobahn in Germany acquire information related to a surrounding environment at a frame rate of 30 frames per second (fps) without synchronizing with each other, a maximum 16.7 ms of difference in capturing time is present among the plurality of cameras, and a spatial position captured by each camera varies by maximum 1.2 m approximately. In order to extract the surrounding environment information after dealing with such a difference in video acquisition time, an additional process that is different from an original surrounding environment information extraction process is needed.

Accordingly, it is important that each camera acquires a video substantially at the same time. For example, in a case where the automobile is traveling at a speed of 250 km/h, and each camera acquires a video at a difference in time of less than or equal to 150 µs, a difference in spatial position captured by each camera is 10 mm, and the additional process is not needed.

In general, not only a lens system and an image sensor (for example, a CMOS image sensor) but also an oscillator that drives the image sensor by supplying a clock to the image sensor are arranged inside a camera module. However, oscillation characteristics of the oscillator have individual differences. In a case where a capturing timing is generated in each of a plurality of camera modules using a clock output from an incorporated oscillator as a reference, capturing operations of the plurality of camera modules cannot be in synchronization.

In a case where a common clock is supplied to the plurality of camera modules from an external oscillator, the capturing timings of the plurality of camera modules can be set to be substantially the same (Non-Patent Document 2). However, in the case of mounting in the automobile, a clock supply line longer than 10 m may be needed between the external oscillator and the camera module. The weight of the clock supply line causes the fuel efficiency of the automobile to deteriorate. In addition, the clock supply line having a long distance acts as an antenna and causes radiation of an unnecessary electromagnetic wave. Accordingly, it is not preferable to supply a common clock to the plurality of camera modules from the external oscillator.

The capturing timings of the plurality of camera modules can also be set to be substantially the same by supplying a common capturing start timing instruction signal to the plurality of camera modules from the outside instead of the common clock (Non-Patent Document 3). Generally, the camera module has a function of starting capturing by receiving the capturing start timing instruction signal. After capturing is started, the camera module operates based on the clock output from the incorporated oscillator. Thus, a difference of one frame is present in capturing end time. However, by periodically repeating the supply of the common capturing start timing instruction signal to the plurality of camera modules again before the difference leads to a significant problem, the difference in operation timing among the plurality of camera modules can be set to be less than or equal to a difference of a certain constant time.

A frame signal that represents the capturing start timing in each frame is used as the capturing start timing instruction signal periodically supplied to the plurality of camera modules in common. In the case of a frame rate of 30 fps, the frame signal is supplied at an interval of approximately 33 ms. A deviation of an oscillation frequency of the oscillator incorporated in the camera module is generally 100 ppm. In this case, while the difference in operation timing that is present among the plurality of camera modules in a period (33 ms) of one frame from the timing of a certain frame signal until the timing of the subsequent frame signal is maximum 3.3 µs, such a difference is less than the above allowance value (150 µs).

A signal line for supplying the common frame signal to the plurality of camera modules may be longer than 10 m in the same manner as the case of the above clock supply line. While a central operation processor can generate the frame signal, the central operation processor and the image sensor generally do not have a capability of transmitting and receiving the video signal and the frame signal through a signal line having a long distance.

Therefore, a video signal transmitter and a video signal receiver having a capability of transmitting and receiving a signal through a signal line having a long distance are used as dedicated interfaces (Non-Patent Document 4 and Non-Patent Document 5). Each of the video signal transmitter and the video signal receiver is configured as a semiconductor integrated circuit. The video signal transmitter constitutes the camera module along with the image sensor and the like. The video signal receiver constitutes a video signal reception module along with the central operation processor.

The video signal transmitter sends the video signal acquired by the image sensor to the video signal receiver. The video signal receiver receives the video signal sent from the video signal transmitter and provides the video signal to the central operation processor. In addition, the video signal receiver sends a control signal such as the frame signal generated by the central operation processor to the video signal transmitter. The video signal transmitter receives the control signal sent from the video signal receiver and provides the frame signal to the image sensor. In each of the video signal transmitter and the video signal receiver, a general-purpose terminal can be used as a terminal for transmitting and receiving the control signal.

(Non-Patent Document 1): NVIDIA, introducing the forefront of automated driving and automatic identification in "deep learning seminar", announcing improvement and the like in pedestrian detection accuracy using heterogeneous learning, [online], Aug. 26, 2015, Impress Corporation, [searched on Dec. 11, 2017], Internet <URL: https://car.watch.impress.co.jp/docs/topics/717652.html>)

(Non-Patent Document 2): "Image Sensing Products", [online], Sony, [searched on Dec. 11, 2017], Internet <URL: https://www.sony.co.jp/Products/ISPfmterview/vol01.html>).

(Non-Patent Document 3): "Board Setting Method for Camera Connection (External Trigger)—External Trigger Synchronized Capturing Using AIPTool!", [online], AVAL DATA CORPORATION, [searched on Dec. 11, 2017], Internet <URL: http://www.avaldata.co.jp/solutionimaging/cameralinktips/aiptool_ex_trg.html>

(Non-Patent Document 4): "New MotorVu™ 360 reference design enables four-channel HD surround view and recording", [online], Ambarella, [searched on Dec. 11, 2017], Internet <URL: https://www.ambarella.com/news/48/122/Ambarella-Unveils-HD-360-View-Automotive-Camera-Solution>

(Non-Patent Document 5): "B5 Video Serializer/De-Serializer Companion Chips", [online], Ambarella, [searched on Dec. 25, 2017], Internet <URL: https://www.ambarella.com/uploads/docs/MotorVu-360-product-brief.pdf>)

SUMMARY

However, a configuration in which the frame signal generated by the central operation processor is sent to the image sensor through the video signal receiver and the video signal transmitter has the following problem. That is, in the central operation processor that has to perform various processes, it is not easy to perform a process of generating the frame signal at a temporally high accuracy timing and sending the frame signal from the general-purpose terminal. In addition, even in a case where the process of generating and sending the frame signal can be performed in the central operation processor, the frame signal sending process may adversely affect other important processes due to limitations on a processing capability.

In order to resolve such a problem, it is considered that the frame signal is generated in the video signal receiver instead of generating the frame signal in the central operation processor. In a case where the frame signal is generated in the video signal receiver, the throughput of the central operation processor is reduced.

The number of camera modules (that is, the number of video signal transmitters) that are required to perform capturing at approximately the same timing is not constant and varies depending on systems and also is expected to be increased in the future. While a video signal, a control signal, and the like may be able to be transmitted and received between a plurality of video signal transmitters and one video signal receiver, the number of video signal transmitters that can transmit and receive the video signal, the control signal, and the like with one video signal receiver is restricted. In addition, it is not efficient to design and manufacture various video signal receivers depending on the number of video signal transmitters to be connected and prepare a product line-up.

The invention is conceived based on the result of the inventor's review in order to resolve the above problem. An object of the invention is to provide a video signal reception module that can flexibly handle a change in the number of video signal transmitters to be connected, and a video signal transmission and reception system that includes such a video signal reception module and a video signal transmitter.

A video signal reception module of the invention is connected through a signal line to a plurality of video signal transmitters each sending a video signal acquired by capturing by a camera and receives the video signal sent from each of the plurality of video signal transmitters. The video signal reception module includes (1) a first video signal receiver including a frame signal generator that generates a frame signal, a frame signal transmitter that sends the frame signal generated by the frame signal generator to a video signal transmitter of a first group among the plurality of video signal transmitters, and an output unit that outputs the frame signal generated by the frame signal generator, and (2) a second video signal receiver including an input unit that inputs the frame signal output from the output unit of the first video signal receiver, and a frame signal transmitter that sends the frame signal input by the input unit to a video signal transmitter of a second group among the plurality of video signal transmitters.

The first video signal receiver includes an internal oscillator that generates a clock, and the frame signal generator generates the frame signal based on the clock generated by the internal oscillator. Alternatively, the first video signal receiver includes a clock input unit that inputs a clock, and the frame signal generator generates the frame signal based on the clock input by the clock input unit. Alternatively, the first video signal receiver includes an internal oscillator that generates a clock, and a clock input unit that inputs a clock, and the frame signal generator outputs the frame signal generated based on any clock of the clock generated by the internal oscillator and the clock input by the clock input unit.

A video signal transmission and reception system of the invention includes (1) a plurality of video signal transmitters each sending a video signal acquired by capturing by a camera, and (2) the video signal reception module according to claim 1 that receives the video signal sent from each of the plurality of video signal transmitters and sends a frame signal. Each of the plurality of video signal transmitters receives the frame signal sent from the video signal reception module and outputs the frame signal to a corresponding camera.

According to the invention, a change in the number of video signal transmitters to be connected can be flexibly handled.

DETAILED DESCRIPTION

Hereinafter, an embodiment of the invention will be described in detail with reference to the appended drawings. The same elements in the description of the drawings will be designated by the same reference signs, and duplicate descriptions of such elements will not be repeated. It is intended that the invention is not limited to those illustrations and is shown by the claims and includes all changes made within the equivalent meaning and scope of the claims.

Figure 1:
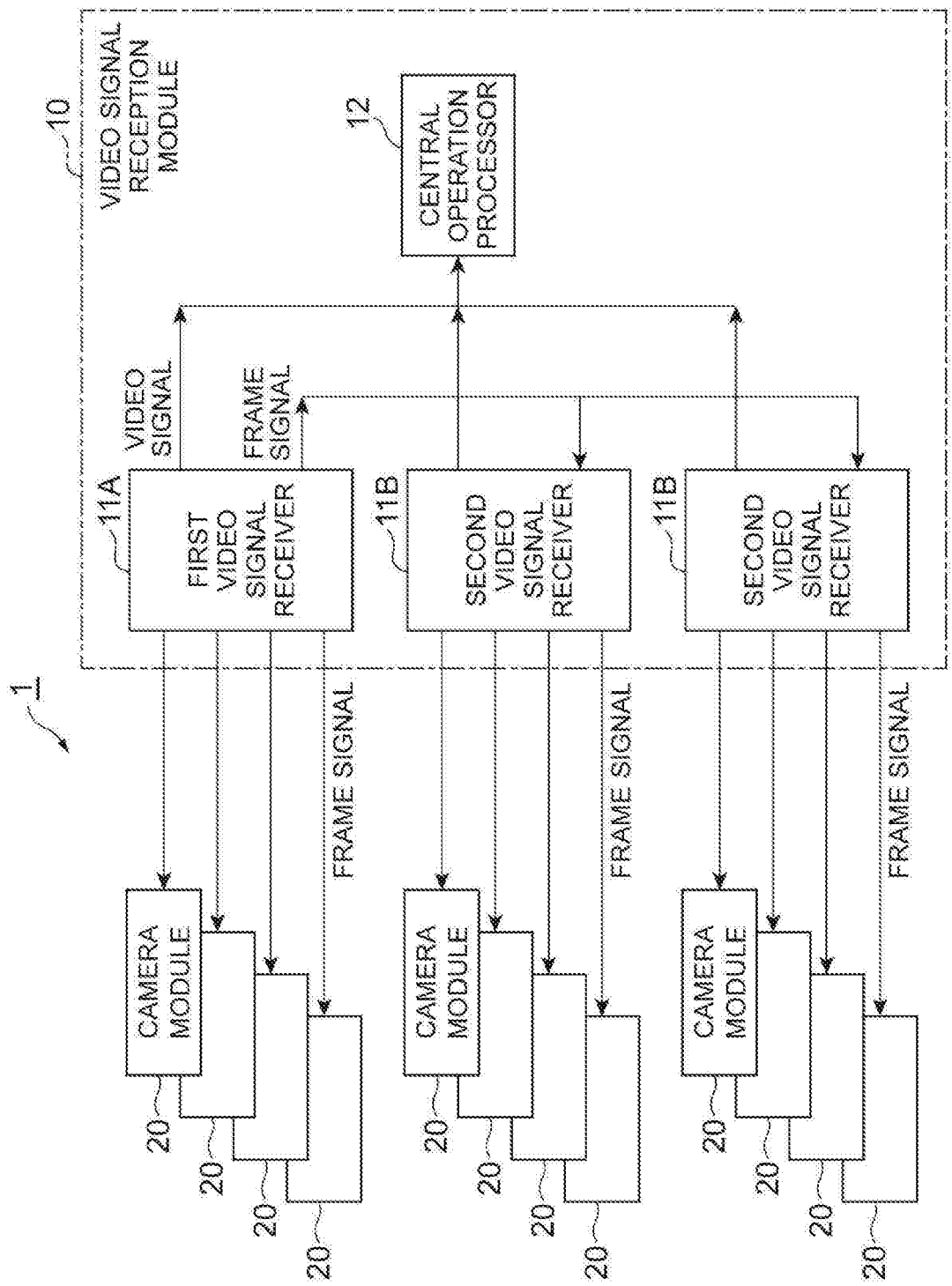
FIG. 1 is a diagram illustrating a configuration of a video signal transmission and reception system 1.
Figure 2:
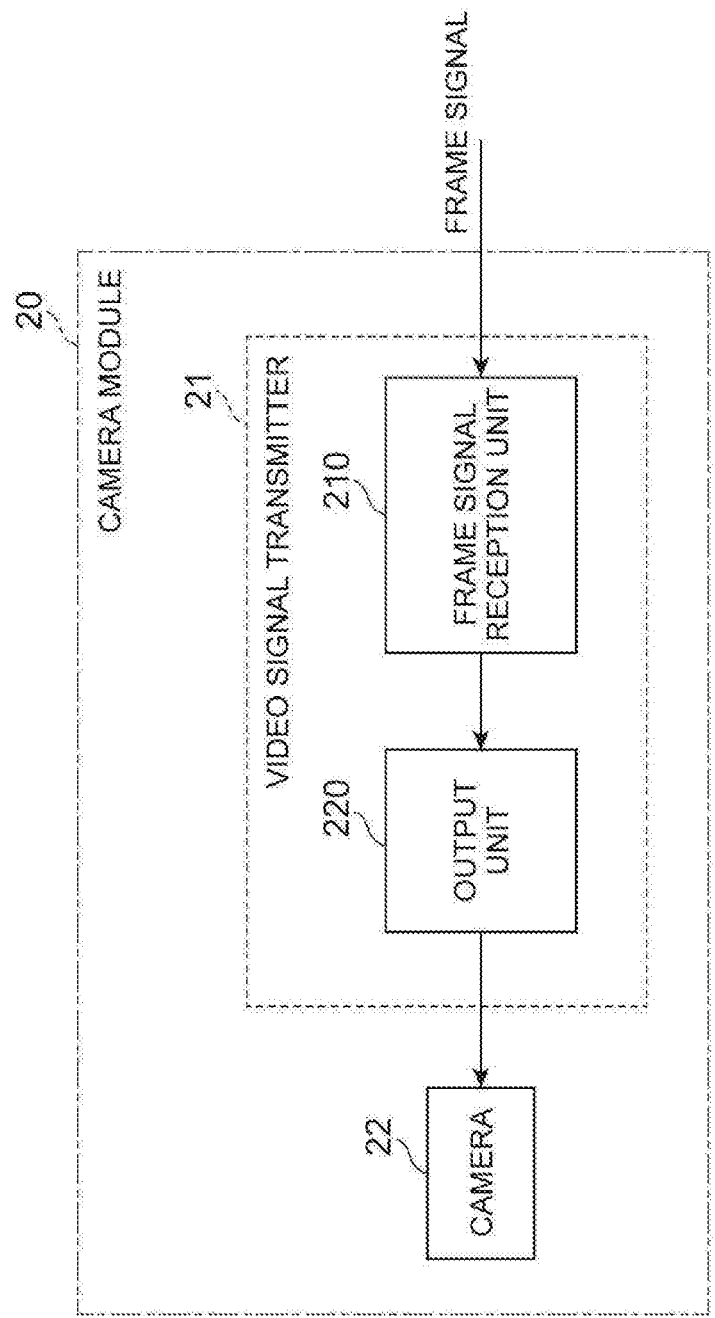
FIG. 2 is a diagram illustrating a configuration of a camera module 20.

FIG. 1 is a diagram illustrating a configuration of a video signal transmission and reception system 1. The video signal transmission and reception system 1 includes a first video signal receiver 11A and a second video signal receiver 11B in a video signal reception module 10 and a video signal transmitter 21 in a camera module 20. The video signal reception module 10 includes the first video signal receiver 11A, the second video signal receiver 11B, and a central operation processor 12. The camera module 20 includes the video signal transmitter 21 and a camera 22 as illustrated in FIG. 2.

While the video signal reception module 10 is configured to include one first video signal receiver 11A and two second video signal receivers 11B in FIG. 1, the number of second video signal receivers 11B included in the video signal reception module 10 is not limited. In addition, the number of camera modules 20 connected to the first video signal receiver 11A and each second video signal receiver 11B is four in FIG. 1 but is not limited. In a case where the video signal transmission and reception system 1 is mounted in an automobile, the video signal reception module 10 and each camera module 20 are connected through a signal line having a long distance (for example, a length of greater than or equal to 10 m), and transmission and reception of a signal can be performed at such a long distance.

In each camera module 20, the camera 22 includes a lens system and an image sensor (for example, a CMOS image sensor) and also includes an oscillator that drives the image sensor by supplying a clock to the image sensor. In each camera module 20, the video signal transmitter 21 receives a frame signal sent from the first video signal receiver 11A or the second video signal receiver 11B using a frame signal reception unit 210 and outputs the frame signal to the camera 22 using an output unit 220. In a case where the frame signal is supplied from the video signal transmitter 21, the camera 22 performs capturing and outputs a video signal acquired by capturing to the video signal transmitter 21. The video signal transmitter 21 receives the video signal acquired by capturing by the camera 22 from the camera 22 and sends the video signal to the first video signal receiver 11A or the second video signal receiver 11B.

Each of the first video signal receiver 11A and the second video signal receiver 11B sends the frame signal to the camera module 20 and receives the video signal sent from the camera module 20. Each of the first video signal receiver 11A and the second video signal receiver 11B outputs the received video signal to the central operation processor 12. The central operation processor 12 performs a necessary process based on the video signal received from the first video signal receiver 11A and the second video signal receiver 11B.

Figure 3:
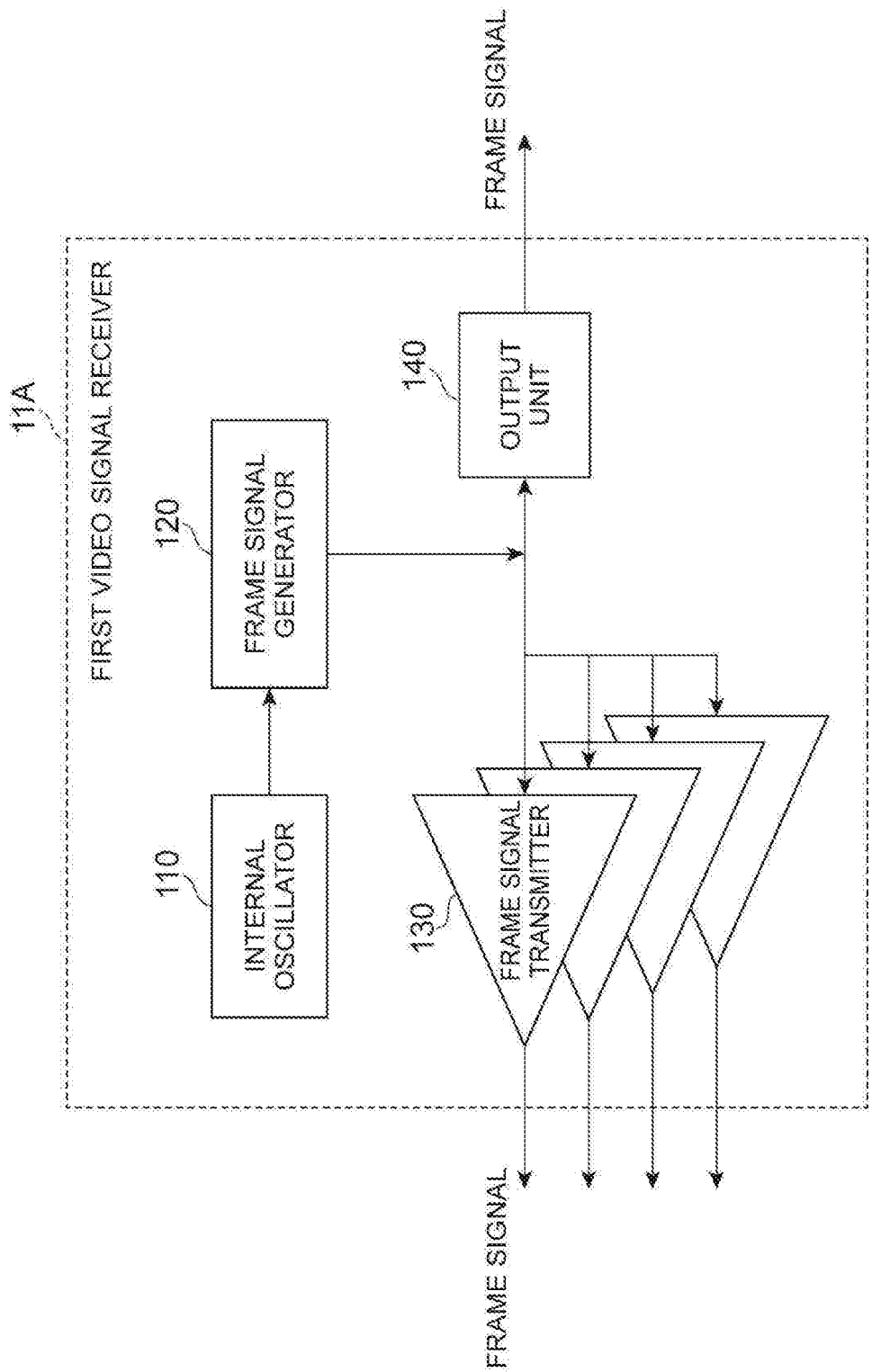
FIG. 3 is a diagram illustrating a configuration of a first video signal receiver 11A.

FIG. 3 is a diagram illustrating a configuration of the first video signal receiver 11A. The first video signal receiver 11A includes an internal oscillator 110, a frame signal generator 120, a frame signal transmitter 130, and an output unit 140. The internal oscillator 110 generates a clock. The frame signal generator 120 generates the frame signal based on the clock generated by the internal oscillator 110. The frame signal transmitter 130 sends the frame signal generated by the frame signal generator 120 to the video signal transmitter 21 of a first group (that is, four video signal transmitters 21 connected to the first video signal receiver 11A through signal lines) among a plurality of video signal transmitters 21. The output unit 140 outputs the frame signal generated by the frame signal generator 120 to the second video signal receiver 11B.

Figure 4:
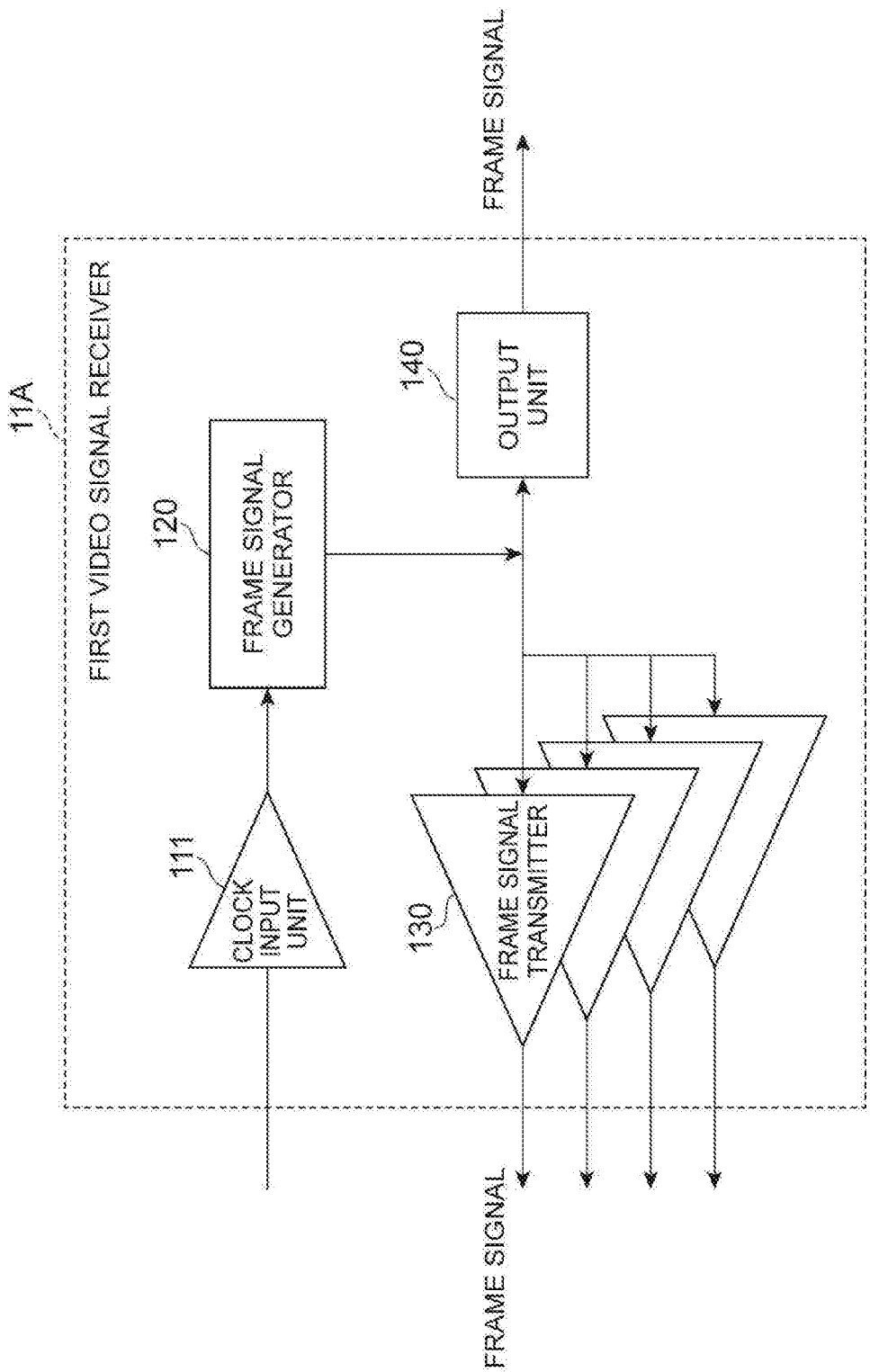
FIG. 4 is a diagram illustrating a configuration of a modification example of the first video signal receiver 11A.

FIG. 4 is a diagram illustrating a configuration of a modification example of the first video signal receiver 11A. The first video signal receiver 11A includes a clock input unit 111 instead of the internal oscillator 110. The clock input unit 111 inputs a clock from the outside. The clock input unit 111 may be a dedicated unit for inputting the clock or may be a general-purpose unit that also inputs other signals in addition to the clock. The clock input by the clock input unit 111 may be generated by an oscillator in the video signal reception module 10 or may be a video signal clock sent from any camera module 20. The frame signal generator 120 generates the frame signal based on the clock input by the clock input unit 111.

Figure 5:
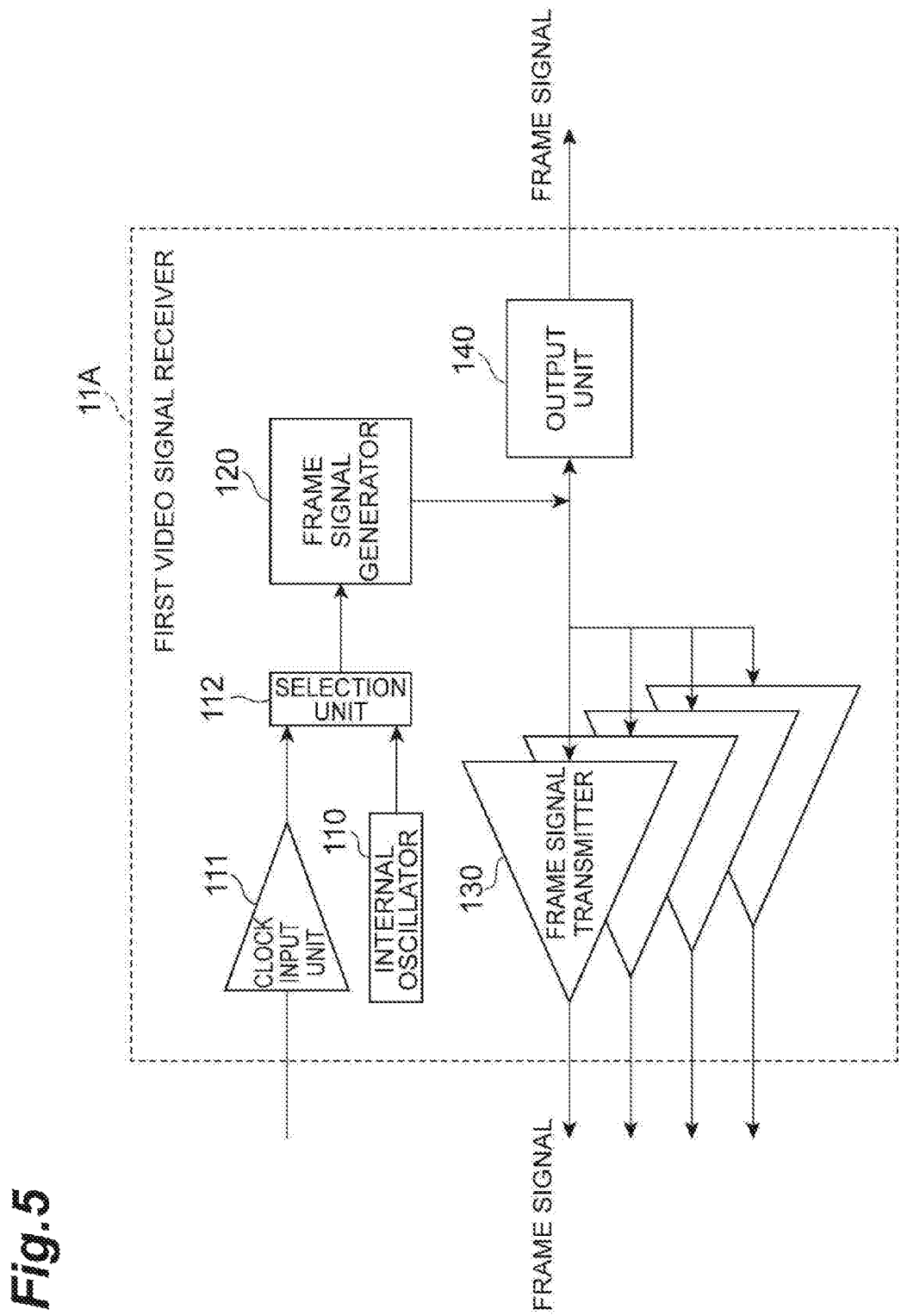
FIG. 5 is a diagram illustrating a configuration of another modification example of the first video signal receiver 11A.

FIG. 5 is a diagram illustrating a configuration of another modification example of the first video signal receiver 11A. The first video signal receiver 11A includes the clock input unit 111 and a selection unit 112 in addition to the internal oscillator 110. The selection unit 112 selects any one clock of the clock generated by the internal oscillator 110 and the clock input by the clock input unit 111 and outputs the selected clock to the frame signal generator 120. The frame signal generator 120 generates the frame signal based on the clock selected and output by the selection unit 112. A first frame signal generator that generates the frame signal based on the clock generated by the internal oscillator 110, and a second frame signal generator that generates the frame signal based on the clock input by the clock input unit 111 may be disposed, and any one frame signal of the frame signal generated by the first frame signal generator and the frame signal generated by the second frame signal generator may be selected and output.

Figure 6:
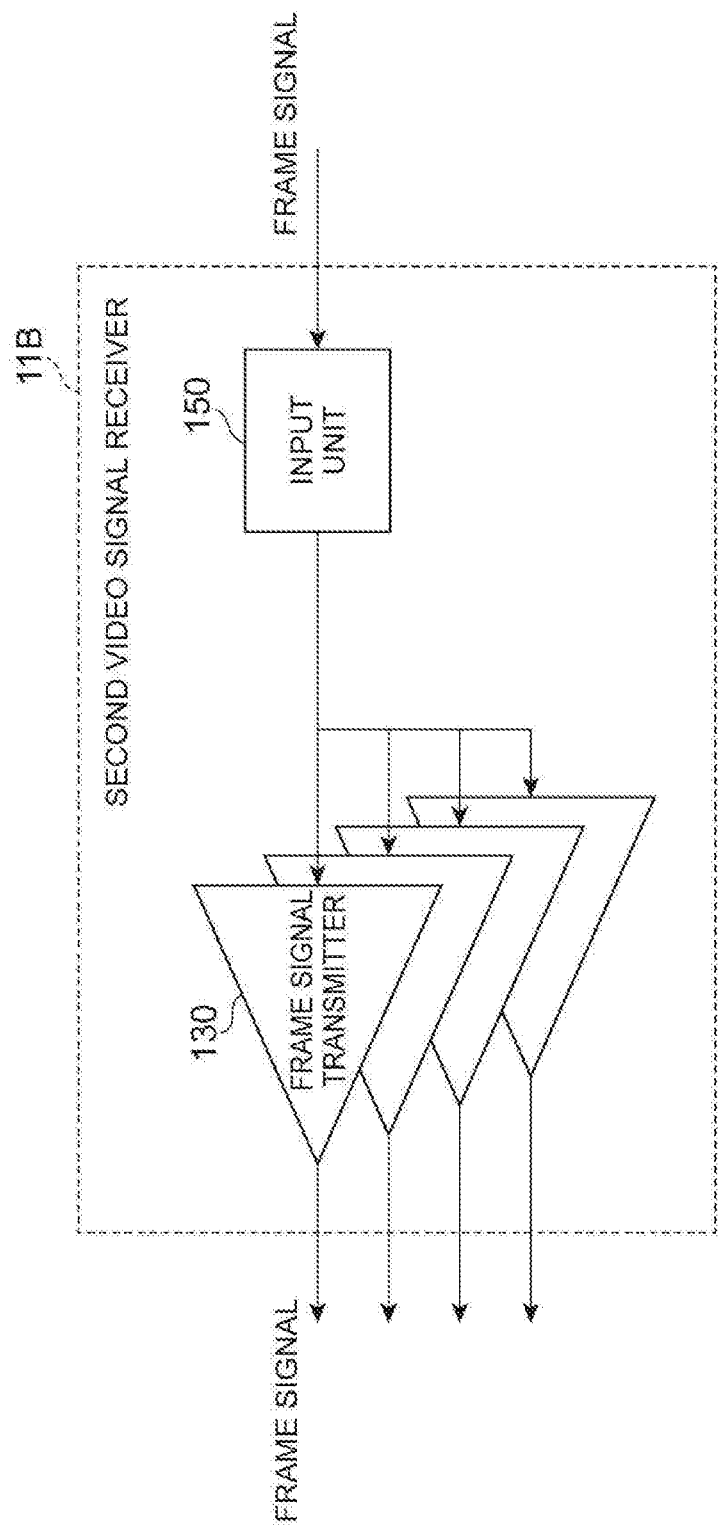
FIG. 6 is a diagram illustrating a configuration of a second video signal receiver 11B.

FIG. 6 is a diagram illustrating a configuration of the second video signal receiver 11B. The second video signal receiver 11B includes the frame signal transmitter 130 and an input unit 150. The input unit 150 inputs the frame signal output from the output unit 140 of the first video signal receiver 11A. The frame signal transmitter 130 sends the frame signal input by the input unit 150 to the video signal transmitter 21 of a second group (that is, four video signal transmitters 21 connected to the second video signal receiver 11B through signal lines) among the plurality of video signal transmitters 21.

In the video signal reception module 10 including the first video signal receiver 11A and the second video signal receiver 11B, the frame signal generated by the frame signal generator 120 in the first video signal receiver 11A is sent to the video signal transmitter 21 of the first group by the frame signal transmitter 130 and is output to the second video signal receiver 11B by the output unit 140. In addition, the frame signal generated by the frame signal generator 120 in the first video signal receiver 11A is input into the input unit 150 of the second video signal receiver 11B and is sent to the video signal transmitter 21 of the second group by the frame signal transmitter 130 of the second video signal receiver 11B.

In the embodiment, it is possible that the number of second video signal receivers 11B included in the video signal reception module 10 is not limited. The number of second video signal receivers 11B included in the video signal reception module 10 may be adjusted depending on the number of video signal transmitters 21 to which the video signal reception module 10 has to supply the frame signal at substantially the same timing. The video signal reception module 10 of the embodiment can flexibly handle a change in the number of video signal transmitters 21 to be connected.

In addition, in the embodiment, the central operation processor 12 does not generate the frame signal, and the first video signal receiver 11A generates the frame signal. In a case where the central operation processor 12 generates the frame signal, it is not easy to perform a process of generating the frame signal at a temporally high accuracy timing and sending the frame signal from a general-purpose terminal in the central operation processor that has to perform various processes. In addition, even in a case where the process of generating and sending the frame signal can be performed, the frame signal sending process may adversely affect other important processes due to limitations on a processing capability. Meanwhile, in the embodiment in which the first video signal receiver 11A generates the frame signal, the problem of the load of the central operation processor 12 is reduced.

As described above, the video signal reception module 10 includes the first video signal receiver 11A, the second video signal receiver 11B, and the central operation processor 12 (central processing unit (CPU)). The central operation processor 12 includes a memory and can include a program that controls the above process. The memory can be disposed outside the central operation processor 12. In addition, a first video signal receiver includes a frame signal generator, a frame signal transmitter that is connected to a video signal transmitter of a first group, and an output unit (an amplifier or the like) that is connected to the frame signal generator. A second video signal receiver includes a frame signal transmitter that is connected to an output terminal of the amplifier and is connected to a video signal transmitter of a second group.

What is claimed is:

1. A video signal reception module configured to perform capturing by a plurality of cameras, the video signal reception module is connected through a signal line to a plurality of video signal transmitters each sending a video signal acquired by capturing by a first camera and the video signal reception module receives the video signal sent from each of the plurality of video signal transmitters, the plurality of cameras comprising the first camera, the video signal reception module comprising:
    a first video signal receiver including:
        a frame signal generator that generates a frame signal, wherein the frame signal is based on a clock and the frame signal is different from the clock,
        a first frame signal transmitter that sends the frame signal generated by the frame signal generator to a first video signal transmitter of a first group among the plurality of video signal transmitters, and
        an output unit that outputs the frame signal generated by the frame signal generator; and
    a second video signal receiver including:
        an input unit that inputs the frame signal output from the output unit of the first video signal receiver, and
        a second frame signal transmitter that sends the frame signal input by the input unit to a second video signal transmitter of a second group among the plurality of video signal transmitters.

2. The video signal reception module according to claim 1,
    wherein the first video signal receiver includes an internal oscillator that generates the clock, and
    the frame signal generator generates the frame signal based on the clock generated by the internal oscillator.

3. The video signal reception module according to claim 1,
    wherein the first video signal receiver includes a clock input unit that inputs a clock, and
    the frame signal generator generates the frame signal based on the clock input by the clock input unit.

4. The video signal reception module according to claim 1,
    wherein the first video signal receiver includes an internal oscillator that generates a clock, and a clock input unit that inputs a clock, and
    the frame signal generator outputs the frame signal generated based on any clock of the clock generated by the internal oscillator and the clock input by the clock input unit.

5. The video signal reception module of claim 1,
    wherein:
    a first group of cameras comprises the first camera,
    the plurality of cameras comprises a second camera in a second group of cameras,
    the second video signal receiver is configured to send a second frame signal, wherein the second frame signal is the frame signal input by the input unit,
    the first video signal receiver is coupled to the first group of cameras and the second video signal receiver is coupled to the second group of cameras, and
    the frame signal and the second frame signal are configured such that a first frame of a first video signal from the first camera is captured at substantially the same time as a second frame of a second video signal from the second camera.

6. A video signal reception module according to claim 1, wherein the video signal reception module is configured to perform substantively simultaneous capturing by the plurality of cameras.

7. A video signal reception module according to claim 1, wherein the video signal reception module is configured to perform substantively simultaneous capturing by the plurality of cameras for an advanced driver assistance system.

8. A video signal transmission and reception system configured to perform capturing by a plurality of cameras, the video signals transmission and reception system comprising:
    a plurality of video signal transmitters sending a plurality of video signals acquired by the plurality of cameras; and
    a video signal reception module that receives the plurality of video signals sent from the plurality of video signal transmitters, a first video signal receiver of the video signal reception module configured to send a first frame signal,
    the video signal reception module comprising:
        the first video signal receiver including:
            a frame signal generator that generates the frame signal, wherein the frame signal is based on a clock and the frame signal is different from the clock,
            a first frame signal transmitter that sends the first frame signal generated by the frame signal generator to a first video signal transmitter of a first group among the plurality of video signal transmitters, and
            an output unit that outputs the first frame signal generated by the frame signal generator; and
        a second video signal receiver including:
            an input unit that inputs the first frame signal output from the output unit of the first video signal receiver, and a second frame signal transmitter that sends a second frame signal based on the first frame signal input by the input unit to a second video signal transmitter of a second group among the plurality of video signal transmitters.

9. A video signal transmission and reception system according to claim 8, wherein video signal transmission and reception system is configured to perform substantively simultaneous capturing by the plurality of cameras.

10. A video signal transmission and reception system according to claim 8, wherein video signal transmission and reception system is configured to perform substantively simultaneous capturing by the plurality of cameras for an advanced driver assistance system.

11. A video signal reception module configured to perform capturing by a first camera and a second camera, video signal reception module comprising:
 a first video signal receiver connected to the first camera of a first camera module of a first group; and
 a second video signal receiver connected to the second camera of a second camera module of a second group;
 wherein the first video signal receiver includes:
  a frame signal generator, wherein the frame signal is based on a clock and the frame signal is different from the clock,
  a first frame signal transmitter that is connected to the first frame signal generator and is connected to a first video signal transmitter of the first camera module of the first group, the first video signal transmitter being connected to the first camera, and
  an amplifier that is connected to the frame signal generator, and
 the second video signal receiver includes a second frame signal transmitter that is connected to an output terminal of the amplifier and is connected to a second video signal transmitter of the second camera module of the second group, the second video signal transmitter being connected to the second camera.

12. A video signal reception module according to claim 11, wherein the video signal reception module is configured to perform substantively simultaneous capturing by the first and second cameras.

13. A video signal reception module according to claim 11, wherein the video signal reception module is configured to perform substantively simultaneous capturing by the first and second cameras for an advanced driver assistance system.

* * * * *